US007011290B2

(12) United States Patent
Rodrigues

(10) Patent No.: US 7,011,290 B2
(45) Date of Patent: Mar. 14, 2006

(54) PNEUMATICALLY-CONTROLLED NEEDLE VALVE

(75) Inventor: Jose Rodrigues, Saint-Guillaume (FR)

(73) Assignee: Eisenmann France Sarl, (FR)

( * ) Notice: Subject to any disclaimer, the term of this patent is extended or adjusted under 35 U.S.C. 154(b) by 10 days.

(21) Appl. No.: 10/466,462

(22) PCT Filed: Jan. 18, 2002

(86) PCT No.: PCT/FR02/00214

§ 371 (c)(1),
(2), (4) Date: Oct. 14, 2003

(87) PCT Pub. No.: WO02/057672

PCT Pub. Date: Jul. 25, 2002

(65) Prior Publication Data

US 2004/0061086 A1 Apr. 1, 2004

(30) Foreign Application Priority Data

Jan. 19, 2001 (FR) .................................... 0100751

(51) Int. Cl.
*F16K 31/143* (2006.01)

(52) U.S. Cl. ..................................................... 251/63.5

(58) Field of Classification Search ............... 251/63.5, 251/63.6

See application file for complete search history.

(56) References Cited

U.S. PATENT DOCUMENTS

| | | | |
|---|---|---|---|
| 3,904,167 A | 9/1975 | Touch et al. | |
| 4,336,826 A * | 6/1982 | Grawunde | 137/540 |
| 4,585,207 A | 4/1986 | Shelton | |
| 4,778,150 A * | 10/1988 | Pratt et al. | 251/214 |
| 4,874,014 A * | 10/1989 | Grant et al. | 137/606 |
| 5,048,578 A * | 9/1991 | Dorf et al. | 141/346 |

FOREIGN PATENT DOCUMENTS

| | | |
|---|---|---|
| DE | 298 14 489 | 12/1999 |
| WO | WO 98/08615 | 3/1998 |

OTHER PUBLICATIONS

International Search Report; PCT/FR02/00214; Oct. 6, 2002.

* cited by examiner

*Primary Examiner*—J. Casimer Jacyna
(74) *Attorney, Agent, or Firm*—Cantor Colburn LLP

(57) ABSTRACT

A pneumatically controlled needle valve including a cylindrical body intended to be mounted in a bore of a device, two annular sealing surfaces delimiting a chamber connected to a compressed-air supply device, a first compartment arranged inside the body communicatively with the chamber, a second compartment, a piston separating the first and second compartments, a rod having the piston secured thereto, the rod protruding axially from the body, a needle disposed on the rod intended, depending on a position of the needle, to bear or not to bear against a seat of the bore, at least one spring disposed in the second compartment, the spring acting on the rod in a direction for closing the valve by pressing the needle onto the seat, while air under pressure from the compressed air supply device acts on the piston in the opposite direction, the rod passing with sealing through a front end of the body, and a plug for closing a rear end of the body, the plug being connected to the body in such a way as to be prevented from a translational movement but free to rotate thereon, the plug being externally threaded to be screwed into a lapping of the bore.

8 Claims, 1 Drawing Sheet

PNEUMATICALLY-CONTROLLED NEEDLE VALVE

TECHNICIAL FIELD OF THE INVENTION

The subject of the present invention is a pneumatically controlled needle valve. This valve is intended in particular to equip color changing units and paint sprayers used in painting plants, for example in the motor industry.

DESCRIPTION OF THE RELATED ART

A valve of this type comprises, in a known way, a cylindrical body intended to be mounted in a bore of the device that is to be equipped, with the formation of two annular sealing surfaces delimiting a chamber which, connected to a compressed-air supply device, communicates with a first compartment arranged inside the body and separated from a second compartment by a piston. The piston is secured to a rod protruding axially from the front end of the body, the end of which rod is equipped with a needle intended, depending on its position, to bear or not to bear against a valve seat. The second chamber contains at least one spring acting on the rod in a direction for closing the valve by pressing the needle onto its seat. Air under pressure acts, in the first compartment, in the opposite direction. As the rod passes through the front end of the body, sealing is provided here. Generally, the body is totally cylindrical, and its front end is perpendicular to its axis. This technique poses problems of centering and of concentricity between the body of the valve and the bore formed in the device that is to be equipped. If the centering is not perfect, the needle will not press symmetrically against its seat, and this may result in a lack of sealing at the needle and in the mixing of two colors at the valve; this defect, that cannot automatically be detected, may even go so far as to "contaminate" the color distribution circuit, that is to say several hundreds of liters of paint.

Likewise, the lack of centering may produce wear on the seals and possibly a lack of sealing.

This type of valve is mounted in a housing formed in a body or unit in such a way that three distinct zones are created:

- a first zone, situated at the front of the valve at the needle, consists of a paint chamber into which the paint supply duct, and possibly the recirculation duct, opens; this chamber communicates with the duct supplying the spray nozzle with paint;
- an intermediate second zone, generally situated at the central part of the valve, consists of a chamber under compressed air used to operate the valve; the compressed air supply and exhaust dusts open into this chamber;
- a third zone, situated at the rear of the valve, is in connection with the surrounding environment.

These zones are sealed against each other by seals of the O-ring type placed externally on the exterior body of the valve. A first seal seals between the "paint" and "air" zones, a second seals the "air" zone from the outside.

The sealing function of these seals is of primordial importance; indeed, a lack of sealing at the first seal would lead to paint being drawn back into the compressed air network, something which is not automatically detectable; defective sealing of the second seal would lead to an absence of control over the valve; overall lack of sealing of both seals would lead to paint being leaked into the machine in a way not automatically detectable.

Now, as the valve is generally screw-mounted in the housing of the body or unit, these "O-ring" seals experience significant friction during mounting, and this may twist and damage them. This damage is not visible once the valve is mounted in its body.

Sealing at the piston rod is itself of primordial importance because the consequences of a lack of sealing would be similar to those described above.

BRIEF SUMMARY OF THE INVENTION

The invention provides a pneumatically controlled needle valve of the type concerned, in which the sealing between the annular sealing surfaces of the body and the wall of the bore in which the body is mounted does not run the risk of being damaged at the time of mounting, with which centering is perfectly assured, and in which the sealing between the rod bearing the needle and the body is assured without generating excessive amounts of friction.

To this end, in the valve according to the invention, of the aforementioned type, the rear end of the body of the valve is closed by a plug connected to said body in such a way as to be prevented from translational movement but free to rotate thereon, this plug being externally threaded so that it can be screwed into a tapping of the bore.

Advantageously, the plug is connected to the body of the valve by clipping.

According to another feature of the invention, the front part of the body of the valve has a frustoconical shape centered on the axis of the rod and with the same inclination as a frustoconical bearing surface delimiting part of the bore accommodating the valve. This feature allows the plug to be screwed into the bore of the device without the valve body pivoting, and therefore without the risk of twisting the O-rings that seal between the valve body and the wall of the bore.

Centering is thus ensured perfectly because of the frustoconical bearing surfaces which also contribute to the sealing between the body of the valve and the wall of the bore in which said valve is mounted.

According to another feature of the invention, the rod secured to the piston protrudes beyond the rear of the body of the valve by passing through an orifice formed in the rear wall of the body, and the end of the rod comprises manual actuating means such as a peripheral groove. This arrangement makes it possible, if need be, to pull the rod, against the action of the spring, so as to manually open the valve, in order to perform test operations. Such an option is not usually afforded, the tests having to be done by causing the valve to open from the control cabinet, which is not necessarily situated near the spray nozzle, in the case of a painting plant, thus entailing two operators.

According to another feature of the invention, the sealing of the passage of the rod at the front end of the valve body is achieved by two lip seals. Furthermore, the sealing of the piston inside the valve body is achieved by a lip seal. These features are advantageous because they make it possible to reduce the number of seals, and therefore the friction resulting from the presence of these seals. It is therefore possible to operate such a valve using a control pressure of a relatively low magnitude, for example of 6 bar.

In order to improve the sealing of the valve when the latter is in the closed position, the needle is made of plastic and associated with a seat made of stainless steel.

BRIEF DESCRIPTION OF THE DRAWINGS

In any event, the invention will be clearly understood with the aid of the description which follows, with reference to the attached schematic drawing which, by way of example, depicts one embodiment of this pneumatically controlled needle valve.

DETAILED DESCRIPTION OF THE INVENTION

Figure 1:
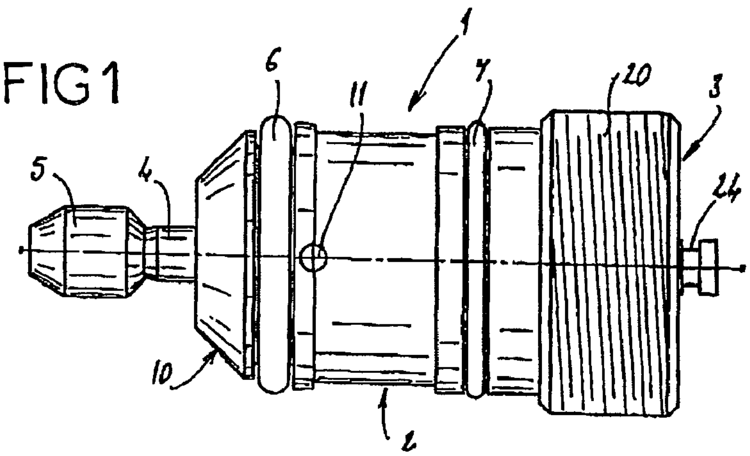
FIG. 1 is a side view of a valve according to the invention.

The valve 1 according to the invention is depicted in an exterior view in FIG. 1 and comprises a body 2 the posterior end of which is equipped with a plug 3, and from the front end of which there protrudes a rod 4 equipped with a needle 5.

Figure 2:
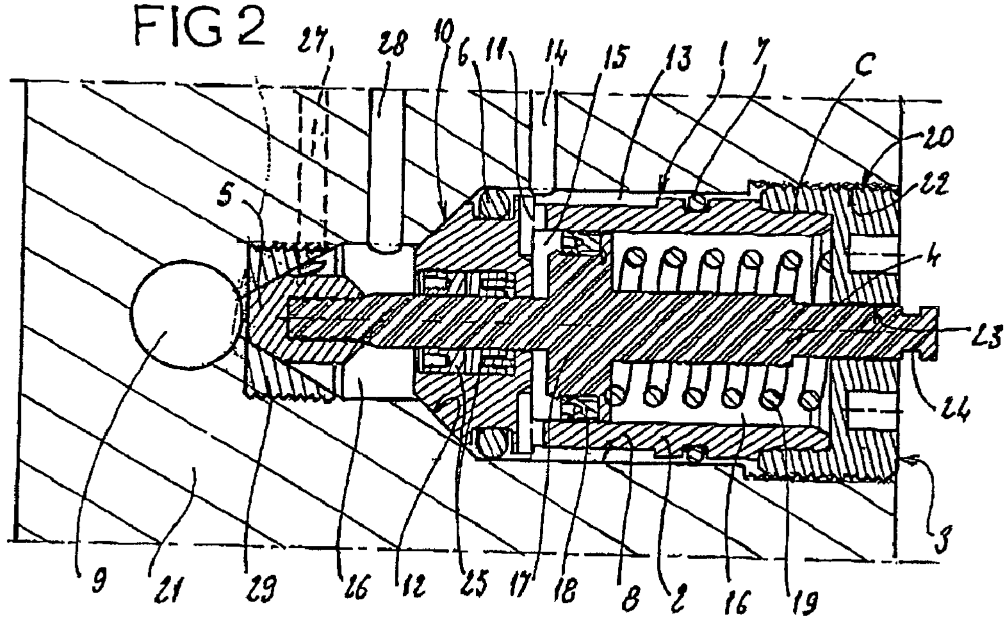
FIG. 2 is a view in longitudinal section of this valve in the position mounted in the body of a color changing unit of a painting plant.

The valve body 2 is of cylindrical shape and is equipped at its periphery with two annular seals 6 and 7 intended to seal against a cylindrical bore 8 formed in a color changing unit 21 of a painting plant, part of which is depicted in FIG. 2. The bore 8 opens into a duct 9 intended to convey the paint, the duct 9 being formed in the unit 21.

As shown in FIGS. 1 and 2, the front end of the body 2 comprises a frustoconical bearing surface 10 intended to bear against a bearing surface 12 that the bore 8 formed in the color changing unit comprises. This arrangement ensures, on the one hand, the centering of the valve 1 inside the bore 8 and, on the other hand, contributes to the sealing between the valve body and the wall of the bore.

As shown in FIG. 2, the exterior wall of the body 2 delimits, with the bore 8, an annular chamber 13 that can be supplied with air under pressure via a duct 14 of the unit 21. The annular chamber 13, which is sealed by the seals 6 and 7, communicates with a compartment formed inside the body 2, by orifices 11. The inside of the body 2 comprises the compartment 15 and a second compartment 16 situated on the rear side, these compartments being separated from one another by a piston 17 with the piston 17 being sealed from the body 2 by a lip seal 18. The compartment 16 contains a spring 19 bearing against the piston 17 to move the rod 4 towards the front of the body 2. The rear part of the body 2 is fixed by the plug 3. The plug 3 is clipped onto the body 2 by suitable complementary shapes as indicated at C in FIG. 2, so that it is incapable of translational movement with respect to the body 2 but free to turn with respect to the latter. This plug 3 has an external screw thread 20 intended to allow it to be screwed into a tapping 22 of the bore 8. Thus, the valve 1 is fixed by screwing the plug 3 into the tapping 22 of the bore 8. It should be noted that, as the plug 3 is screwed in, the body 2 of the valve 1 is not made to turn, which means that risks of twisting the seals 6 and 7 and the lack of sealing that could result from this are avoided.

As shown in FIGS. 1 and 2, the rod 4 passes through the plug 3 via an opening 23, and the outer end of the rod 4 has a peripheral groove 24 allowing this rod 4 to be actuated manually using a tool (not depicted).

The front part of the rod 4 passes through the front part of the body 2, sealing here being achieved using two lip seals 25. The front part of the rod 4 is arranged inside a chamber 26 of the unit 21, into which chamber a duct 27 for conveying paint and a duct 28 for returning unused paint to the tank open, the ducts 27 and 28 being built into the unit 21.

The needle 5, mounted at the end of the rod 4, is intended to bear against a seat 29 made of stainless steel, whereas the needle 5 is made of plastic.

The valve 1 is depicted, in FIG. 2, in its closed position. This closed position is maintained under the action of the spring 19, the compartment 15 then not being supplied with pressurized air. To open the valve 1, pressurized air conveyed by the duct 14 is introduced into the compartment 15, thus pushing back the piston 17 and the rod 4 against the action of the spring 19. The duct 9 is then placed in communication with the chamber 26, allowing paint to pass from the paint supply duct 27 to the duct 9 then to the paint spraying nozzle. When the air pressure in the compartment 15 is removed, the spring 19 recloses the valve 1.

As is evident from the foregoing, the invention provides a great improvement to the existing art by providing a pneumatically controlled needle valve which is of simple structure, offers excellent sealing qualities, does not require a high air pressure to operate it, and can be actuated manually by direct action on the rod bearing the needle.

What is claimed is:

1. A pneumatically controlled needle valve comprising:

a cylindrical body intended to be mounted in a bore of a device;

two annular sealing surfaces delimiting a chamber connected to a compressed-air supply device;

a first compartment arranged inside the body communicatively with the chamber;

a second compartment;

a piston separating the first and second compartments;

a rod having the piston secured thereto, the rod protruding axially from the body;

a needle disposed on to rod intended, depending on a position of the needle, to bear or not to bear against a seat of the bore;

at least one spring disposed in the second compartment, the spring acting on the rod in a direction for closing the valve by pressing the needle onto the seat, while air under pressure from the compressed air supply device acts on the piston in the opposite direction, the rod passing with sealing through a front end of the body; and a plug for closing a rear end of the body, the plug being connected to said body in such a way as to be prevented from a translational movement but free to rotate thereon, the plug being externally threaded to be screwed into a lapping of the bore.

2. The valve as claimed in claim 1, wherein the plug is connected to the body of the valve by a clipping.

3. The valve as claimed in claim 1, wherein the front end of the body of the valve has a frustoconical shape centered on an axis of the rod and includes a same inclination as a frustoconical bearing surface delimiting part of the bore accommodating the valve.

4. The valve as claimed in claim 1, wherein the rod secured to the piston protrudes beyond the rear end of the body of the valve by passing through an orifice formed in the plug of the body, and an end of the rod comprises a means for manually actuating the rod.

5. The valve as claimed in claim 1, wherein the scaling of to passage of the rod at the front end of the valve body comprises two lip seals.

6. The valve as claimed in claim 1, wherein the piston is sealed inside the valve body by a lip seal.

7. The valve as claimed in claim 1, wherein the needle comprises a plastic and the seat comprises a stainless steel.

8. The valve as claimed in claim 4, wherein the means for manually actuating the rod comprises a peripheral groove.

* * * * *